United States Patent [19]

Weinert, Jr. et al.

[11] Patent Number: 4,727,123

[45] Date of Patent: Feb. 23, 1988

[54] CATALYSTS FOR THE POLYMERIZATION OF CONJUGATED DIENES

[75] Inventors: Raymond J. Weinert, Jr., Garfield Heights; Kenneth C. Benton, Macedonia; Michael J. Desmond, Cleveland Heights, all of Ohio

[73] Assignee: The Standard Oil Company, Cleveland, Ohio

[21] Appl. No.: 485,095

[22] Filed: Apr. 14, 1983

[51] Int. Cl.[4] .......................... C08F 4/76; C08F 4/78; C08F 4/44

[52] U.S. Cl. .................................. 526/124; 526/132; 526/161; 526/162; 526/164

[58] Field of Search .............. 526/119, 160, 124, 162, 526/125, 132, 161, 133, 164, 140, 141, 142

[56] References Cited

U.S. PATENT DOCUMENTS

| | | | |
|---|---|---|---|
| 4,004,071 | 1/1977 | Aishima et al. | 526/116 |
| 4,028,272 | 6/1977 | Throckmorton | 526/140 |
| 4,048,418 | 9/1977 | Throckmorton | 526/140 |
| 4,071,673 | 1/1978 | Hwang | 526/124 |
| 4,204,050 | 5/1980 | Bressler et al. | 526/97 |
| 4,233,182 | 11/1980 | Hoff et al. | 526/121 |
| 4,435,552 | 3/1984 | Evens | 526/141 |
| 4,452,914 | 6/1984 | Coleman, III | 526/142 |

OTHER PUBLICATIONS

Desmond, "Part I: Catalytic Reactions of Anion-Exchange Resin Bond Dodecarhodium Triacontacarbonyl Dianion and its Derivatives and Part II: Properties and Reactions of Neutral Non-Polar Solvent Soluble Binuclear Complexes", Dept. of Chemistry, University of Illinois at Urbana-Champaign, 1980, pp. 66-219.

*Primary Examiner*—Christopher Henderson
*Attorney, Agent, or Firm*—David P. Yusko; John E. Miller; Larry W. Evans

[57] ABSTRACT

Conjugated dienes are polymerized by a catalyst system comprised of a transition metal complex consisting of at least one binucleating ligand attached to at least one transition metal containing nucleus; and at least one organometallic cocatalyst containing at least one element of Group IA, IIA or Group IIIA.

46 Claims, No Drawings

CATALYSTS FOR THE POLYMERIZATION OF CONJUGATED DIENES

BACKGROUND OF THE INVENTION

1. Field of the Invention

This invention relates to the polymerization of conjugated dienes. More specifically, this invention relates to catalyst system for the polymerization of 1,3 butadiene.

2. Description of Prior Art

Many catalysts have been developed for the polymerization of conjugated dienes. One of the earliest and perhaps the most well known is the Ziegler catalyst consisting of a chemical complex derived from a transition metal halide and a metal hydride or a metal alkyl. Other catalysts include a variety of transition metal compounds used in combination with organometallic aluminum and/or magnesium compounds.

Despite the large amount of work done in this area, scientists and chemists continue to search for improved polymerization catalysts.

SUMMARY OF THE INVENTION

A process employing a novel catalyst system for the polymerization of conjugated dienes has been developed. This process comprises contacting, at a temperature and pressure sufficient to cause polymerization, a conjugated diene with catalyst system comprising a transition metal complex catalyst of at least one binucleating ligand which attaches to at least one nucleus which contains at least one transition metal, and a cocatalyst of at least one organometallic compound containing at least one element of Group IA, Group IIA or Group IIIA.

DETAILED DESCRIPTION OF THE INVENTION

Dienes are alkenes that contain two carbon-carbon double bonds. Conjugated dienes are a class of dienes where the two double bonds are separated by one single bond. The instant invention pertains to a process for the polymerization of conjugated dienes. Representative of the conjugated dienes suitable for this invention are 1,3-butadiene, 1,3-pentadiene, 1,3-hexadiene, 2-methyl-1,3 butadiene (isoprene), 2,3-dimethyl-1,3-butadiene and 2-chloro-1,3-butadiene. The preferred conjugated diene is 1,3-butadiene.

THE CATALYST SYSTEM

The catalyst system consists of two components. The first component or catalyst is a transition metal complex of at least one ligand which attaches to at least one nucleus, but more commonly simultaneously attaches to two nuclei. The transition metals employed in this complex include those elements of Groups IB, IIB, IIIB, IVB, VB, VIB, VIIB and VIII, of the Periodic Table of Elements, which will be subsequently referred to simply as transition metals. The second component or cocatalyst is at least one organometallic compound containing at least one element of Group IA, Group IIA and Group IIIA of the Periodic Table of Elements. The Periodic Table referred to herein is that appearing in the *Handbook of Chemistry and Physics*, 61st ed., Chemical Rubber Co. (1980).

THE CATALYST

The transition metal complex catalyst contains at least one ligand. As here used, a ligand is a molecule, ion, or atom that is attached to the central atom or molecule of a coordination compound. A ligand which can attach to two central atoms or molecules is a binucleating ligand. A binucleating ligand is further defined to be a ligand which has the ability to bind in a multidentate fashion to two metal containing centers. The catalysts of the instant invention preferably utilize a binucleating ligand. However, where the nucleus, i.e. the central atom or molecule, is large, a single nucleus will satisfy the bonding requirements of the normally binucleating ligand.

The transition metal complex consists of a binucleating ligand attached to at least one nucleus, which contains at least one transition metal. Preferably the binucleating ligand simultaneously attaches to two nuclei. Preferably both nuclei contain at least one transition metal. It is not mandatory that both nuclei contain the same elemental components. Optionally the second nucleus may contain at least one metal from Group I, Group IIA and Group IIIA of the Periodic Table. As here used and throughout the specification and claims, when a nucleus is said to "contain" an element or compound, then that nucleus is either that element or compound per se or the nucleus is a larger composition which includes that element or compound.

The transition metal complex of at least one binucleating ligand is a coordination compound. The bonding in a coordination compound is neither covalent nor electrostatic but is usually considered to be an intermediate between the two types. For purposes of this specification, a dotted line will be used in formulae and structures of transition metal complexes in order to show the locations of this coordination compound type bonding.

Preferred transition metal complexes of binucleating ligands are:

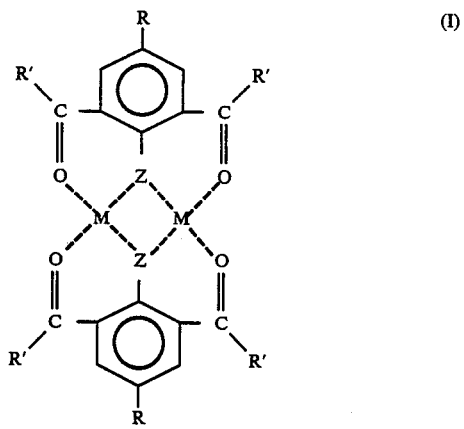

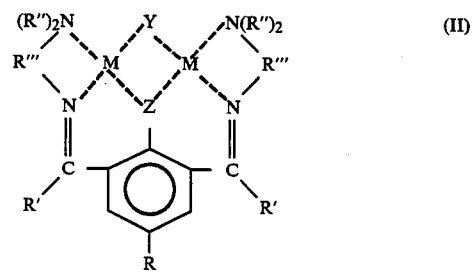

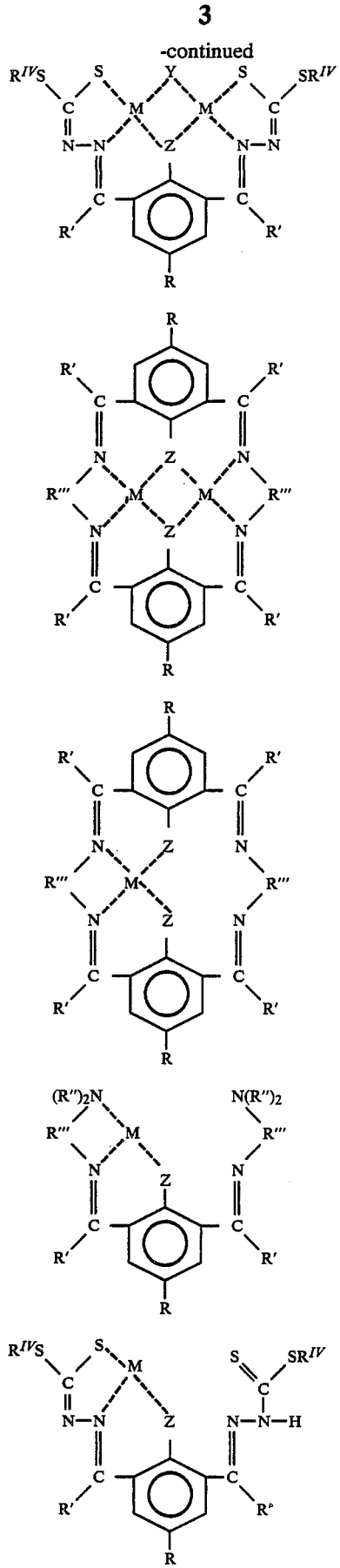

(III)

(IV)

(V)

(VI)

(VII)

Each R and $R^{IV}$ are independently hydrogen or an aliphatic, cycloaliphatic or aromatic radical or an inertly substituted derivative of any one of these. Preferably each R and $R^{IV}$ are independently a $C_1$ to $C_{20}$ aliphatic radical, a $C_5$ to $C_7$ cycloaliphatic radical, phenyl radical or an inertly substituted derivative of any one of these. More preferably each R and $R^{IV}$ are a $C_1$ to $C_{12}$ alkyl radical.

Each R' and R'' are independently hydrogen or an aliphatic radical or an inertly substituted derivative thereof. More preferably each R' and R'' are independently hydrogen or a $C_1$ to $C_6$ alkyl radical. Most preferably each R' and R'' are hydrogen or a methyl radical.

Each R''' is independently an aliphatic, cycloaliphatic or aromatic radical or an inertly substituted derivative of any one of these. Preferably each R''' is independently a $C_1$ to $C_8$ aliphatic radical, a $C_5$ to $C_7$ cycloaliphatic radical, a phenyl radical or an inertly substituted derivative of any one of these.

Each M denotes a nucleus of the binucleating ligand. Each M contains at least one element of Group IB—VIIB, Group VIII, Group IA, Group IIA and Group IIIA of the Periodic Table with the proviso that at least one M contains an element of Group IB-VIIB and Group VIII, i.e. a transition metal.

Where M contains a transition metal, each M may be:
1. at least one transition metal. Preferred transition metals are vanadium, molybdenum, chromium and cobalt. The more preferred transition metal is cobalt.
2. a coordination compound containing at least one transition metal. A coordination compound is formed by the union of a metal ion with a nonmetallic ion or molecule called a ligand. A coordination compound may consist of one ligand or several ligands attached to a central atom or molecule called the nucleus. The transition metal is contained in the nucleus of the coordination compound. The ligands may be monodentate or multidentate. Suitable ligands include but are not limited to any alkoxide, azide, halide, sulfide, carboxylate, nitrate, sulfate, phosphate, perchlorate, amine, ether, thioether, phosphine, arsine, and oxime. Preferred coordination compounds are acetato cobalt and acetato chromium.
3. A compound containing at least one transition metal and at least one of oxygen, sulfur and selenium. Compounds containing a transition metal bonded to oxygen are preferred. Vanadium bonded to oxygen is more preferred.

Where M contains an element of Group IA, Group IIA and Group IIIA, preferred elements are hydrogen, beryllium, magnesium and calcium with magnesium more preferred.

In some embodiments, each M is the same transition metal, coordination compound or transition metal oxide, sulfide or selenide. In a preferred embodiment, one M contains a transition metal, e.g. cobalt, and the other M contains a coordination compound, e.g. acetato cobalt. In another preferred embodiment, one M contains vanadyl, chemical formula: (V=O) and the other M contains either cobalt or acetato cobalt. In another embodiment, one M contains a transition metal and the other M contains a nontransition metal from Groups IA, IIA or IIIA.

Y is any coordinating anion. Suitable coordinating anions are at least one of any alkoxide, halide, azide, hydroxide, cyanide, isocyanide, pyrazolate, amide, imidazolate and hydrazide. Preferred coordinating anions are any alkoxide, halide, azide, hydroxide. Most preferred coordinating anions are ethoxy and chloride.

Z is one of oxygen or sulfur.

Typically the ligands and the resulting transition metal complexes shown in formulas I, II and III are prepared by sequential displacement reactions in solution.

THE COCATALYST

The cocatalyst is an organometallic compound or combination of organometallic compounds containing at least one element of Group IA, Group IIA and Group IIIA. An organometallic compound is comprised of a metal attached directly to a carbon atom. The elements of Group IA, Group IIA and Group IIIA of the Periodic Table suitable for use in the cocatalyst are lithium, sodium, potassium, cesium, beryllium, magnesium, calcium, strontium, boron, aluminum and gallium. Preferred cocatalysts are at least one of di-sec-butylmagnesium, n-butylmagnesium chloride, aluminumtriethyl and compounds of the formula:

$$(R^V)_n AlX_{(3-n)}$$

where $R^V$ is at least one of an aliphatic, cycloaliphatic or aromatic radical or an inertly substituted derivative of any one of these, X is a halide and n is less than or equal to 3, but greater than 0.

Preferably $R^V$ is at least one of a $C_1$ to $C_8$ aliphatic radical, a $C_5$ to $C_7$ cycloaliphatic radical or a phenyl radical. More preferably $R^V$ is at least one of an alkyl, aryl, arylalkyl, alkenyl or arylalkenyl radical or an inertly substituted derivative of any one of these. Most preferably $R^V$ is at least one of an ethyl, isopropyl, sec-butyl, isobutyl, cyclohexyl, phenyl, benzyl, 1-octenyl and 1-phenyl-1-heptenyl radical.

Preferably X is at least one of chlorine, bromine and iodine. More preferably X is chlorine.

The more preferred cocatalysts include ethylaluminum dichloride, ethylaluminum sesquichloride and diethylaluminum chloride and mixtures thereof. Ethylaluminum dichloride in combination with diethylaluminum chloride is the most preferred cocatalyst.

Organometallic compounds are frequent cocatalysts in catalyst systems and their preparation is known to those skilled in the art. These catalysts are readily synthesized and many are commercially available.

Typically the transition metal complex catalyst and the organometallic compound cocatalyst are mixed in an inert diluent. The mole ratio of the organometallic compound cocatalyst to the transition metal complex catalyst is between approximately 1:1 and 300:1, preferably between approximately 3:1 and 50:1.

POLYMERIZATION

Typically it is advantageous to polymerize the conjugated diene in the presence of an aromatic, an aliphatic or a halogenated hydrocarbon solvent. Many of the transition metal complexes and organometallic complexes are soluble in such solvents. The catalyst system dissolved in a solvent leads to the greatest efficiency of use of the catalytic metal species.

In one embodiment, the transition metal complex and organometallic compound are first dissolved in a small quantity of solvent. This solution is then added to a larger quantity of an inert diluent to form a heterogenous suspension. An inert diluent is a diluting agent which does not react with the catalyst or the cocatalyst, and in which the catalyst is insoluble or partially soluble. The volume ratio of the solvent solution to the inert diluent is between 5:1 and 50:1. Suitable solvents are aromatic hydrocarbons, or inertly substituted derivative thereof, or a halogenated aliphatic hydrocarbon. Suitable inert diluents are aliphatic and alicyclic hydrocarbons. Preferred inert diluents are n-hexane, n-heptane, 2,2,4-trimethylpentane, and cyclohexane.

Typically the mole ratio of conjugated diene to catalyst is between 100:1 and $1 \times 10^6$:1. However, essentially any amount of catalyst is sufficient to support some polymerization. The conjugated dienes may be polymerized at any temperatures and pressures sufficient for polymerization. The polymerization may be conducted at pressures of approximately 1 to 100 atmospheres and temperatures of approximately 30° C. to 200° C. The preferred conditions for polymerization are pressures of approximately 2 to 60 atmospheres and temperatures of approximately 40° C. to 135° C.

The catalyst system of this invention has several advantages for use in conjugated dienes polymerization. The catalyst system is highly active. The system is efficient in the use of the catalytic metal. The catalysts are insensitive to atmospheric contamination and are thus easily handled. The solubility of the transition metal complex can be tailored to specific requirements by altering the binucleating ligand.

The structure of the polydienes obtained with this catalyst system ranges from substantially trans-1,4 to almost entirely cis-1,4. The structure obtained depends upon the choice of transition metal complex, cocatalyst and solvent. In general, using metal complexes of the instant invention, cocatalysts of the type $(R^V)_n AlX_{(3-n)}$ where n is greater than or equal to 1.5, and aromatic solvents favor the production of highly-cis-1,4-polydienes.

SPECIFIC EMBODIMENTS

The following examples and comparisons which describe the preparation and use of this catalyst system are provided in order to better illustrate the instant invention.

EXAMPLE I

Preparation of the Catalyst

Preparation of the Ligand 50 g sodium hydroxide were dissolved in approximately 1.2 liters of water, and 150 g of 4-tert-butylphenol were added to this solution. The mixture was stirred and gently heated until the phenol dissolved. The solution was then cooled to ambient temperature. Aqueous formaldehyde (175 ml, 37 percent) was added, and the solution was stirred for four to six days at ambient temperature. Concentrated hydrochloric acid (110 ml) was added, upon which a two-phase system forms. A yellow, oily organic phase was isolated and washed with three 500 ml portions of water. Chloroform (700 ml) and 500 ml of water were added to this organic oil and the mixture was stirred. The organic phase was isolated and dried over 100 g of anhydrous magnesium sulphate. Evaporation and cooling of the chloroform solution yielded a mixture of white crystals and oil. The addition of 50-100 ml of chloroform and filtration yielded a white crystalline product, 4-tert-butyl-2,6-di(-hydroxymethyl)phenol.

The 4-tert-butyl-2,6-di(hydroxymethyl)phenol (94.6 g) was added to 300 ml of water containing 23 g of sodium hydroxide. Toluene sulfonylchloride (90 g) and 100 ml of benzene were also added. The system was stirred vigorously for two days, filtered, and the white solid product was washed with three 100 ml aliquots of benzene. A 50–70 percent yield of the tosylated diol was obtained.

The tosylated diol (102 g) was dissolved with heating and stirring in 400 ml of glacial acetic acid. The solution was heated nearly to boiling and 86.3 g of sodium dichromate monohydrate were added very slowly. Upon cooling, the dark green solution yielded a powdery solid. The product was separated from the chromous salt solution and washed with water and 3:1 water:ethanol. The product was then dissolved in boiling ethanol to form an approximately 20 wt./vol percent solution. About 10 vol percent water was added and the solution was cooled while stirring. The pale green crystals of the tosylated diformylphenol which form were recovered by filtration and washed with 1:1 ethanol:water.

The tosylated diformyl compound (30 g) was then dissolved in 35 ml of concentrated sulfuric acid and stirred for at least 30 minutes. The solution was then poured slowly into a 800 ml beaker containing 600 ml of crushed ice. The pink-brown solid which formed was stirred in the ice-water mixture for at least two hours, then recovered by filtration, washed with water, and dried on the filter. The solid was extracted with mixed hexanes, using approximately one liter of hexane per 10 g of solid, until only a purple-red tar remained. The hexane solution was then evaporated to yield the yellow solid, 4-tert-butyl-6-formylsalicylaldehyde. The overall yield was generally of the order of 10–20 percent.

A solution of 34.2 g of potassium hydroxide in 190 ml of absolute ethanol and 20 ml of water was prepared. To this solution was added 34.8 g of 85 percent hydrazine hydrate. The solution was cooled in a sodium chloride-ice-water bath and stirred vigorously while adding dropwise over a two-hour period a solution of 36 ml of carbon disulfide in 39 ml of absolute ethanol, maintaining the reaction temperature at less than 3° C. Filtration of the reaction mixture yielded a white solid, potassium dithiocarbazate.

A solution of 26 g of potassium dithiocarbazate in 50 ml of 40 percent aqueous ethanol was prepared and 44 g of 1-iodoheptane were added. The mixture was stirred at ambient temperature for two days. The reaction flask was wrapped in aluminum foil to prevent the photodecomposition of the heptyliodide. The solution was then cooled in an ice bath and quickly filtered to recover the white solid, S-heptyldithiocarbazate. A yellow oil by-product was then removed by washing the white solid with ligroine. The product was then recrystallized from boiling hexane.

Solutions consisting of 8 g of the freshly-recrystallized S-heptyl-dithiocarbazate in 500 ml of 1:1 ethanol:water and 4.00 g of 4-tert-butyl-6-formylsalicylaldehyde in 200 ml of ethanol were prepared. The two solutions were heated to boiling and quickly filtered. The two solutions were again heated to boiling, and the dialdehyde solution was added, with rapid agitation, to the S-heptyldithiocarbazate solution. A yellow precipitate formed almost immediately. The reaction mixture was allowed to boil for two minutes, then was cooled while stirring, and the yellow solid was isolated by filtration. The product, 4-tert-butyl-bis-2,6-N-(S-heptyl-dithiocarbamate)-formimidoyl-phenol, was washed with three 300 ml portions of 1:1 ethanol:water, followed by two 200 ml portions of 95 percent ethanol. This yellow crystalline solid is a ligand of the following structure:

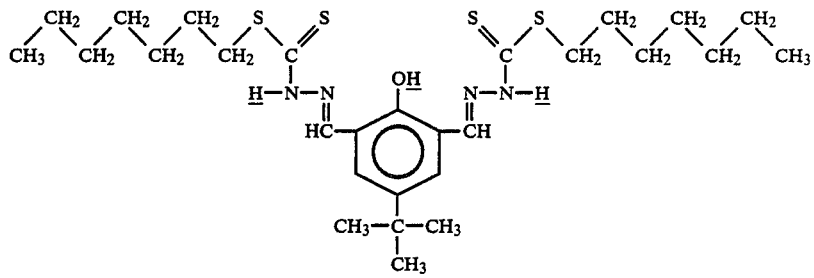

The above ligand will hereinafter be referred to as H$_3$(BNL). The BNL standing for binucleating ligand, and the H$_3$ standing for the 3 hydrogen atoms (underlined in the above structure) which are lost and the bonding altered when the binucleating ligand attaches to one or more nuclei.

EXAMPLES II–VIII

Preparation of Metal Complexes of the above Binucleating Ligand

The preparation of several binuclear metal complex catalysts from the binucleating ligand are described. In these examples (Me) is methyl radical. (Et) is an ethyl radical and (Ac) is an acetyl radical. The structure of each of the catalyst produced was determined by infrared, NMR, ESR spectroscopy and elemental analysis. The formula weight of each catalyst was determined by elemental analysis, mass spectrometry and magnetic susceptibility.

EXAMPLE II

Preparation of (VO)$_2$ (BNL)(OEt)

Vanadyl acetate (389 mg) was combined with 583 mg of the ligand H$_3$(BNL) in 25 ml. of absolute ethanol. The mixture was stirred at ambient temperature for one to three weeks. The reaction mixture was filtered and the solid washed on the filter with ethanol and toluene. The unreacted vanadyl acetate remained on the filter. The filtrate and washings were combined and the solvent was removed on a rotary evaporator. An olive green solid was obtained in a 60–90 percent yield. This solid is a coordination compound of the following structure which has a formula weight of 758.88 g/mole.

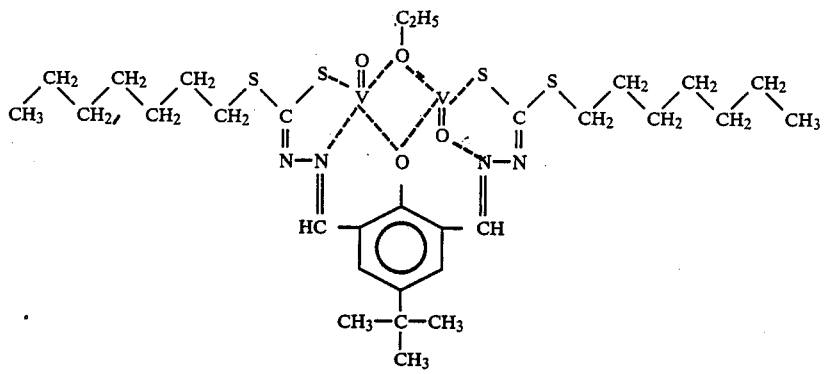

EXAMPLE III

Co$_2$(BNL)(OEt)(OAc)

548 mg of Co(acetate)$_2$.4H$_2$O (2.2 mmoles) and 583 mg of H$_3$(BNL) (1.0 mmoles) were combined in a flask with 18 ml of ethanol and 2 ml of toluene. The solution was stirred for two days after which time the solvent was removed. The dark red-brown solid was washed with methanol and methanol-water followed by drying at 100° C. under vacuum. This method produced a yield of 75 percent of the above catalyst. The formula weight of this catalyst was determined to be 801.91 g/mole.

EXAMPLE IV

Co$_2$(BNL)(OEt)(OAc).toluene 520 mg of Co(acetate)$_2$.4H$_2$O (2.1 mmoles) was dissolved in 20 ml of ethanol. To this solution was added 10 ml of 2,2-dimethyoxypropane (Aldrich). The solution turned from red to green in color. (This addition of a drying agent is optional.) 583 mg of H$_3$(BNL) (1.0 mmoles) was dissolved in 10 ml of THF and combined with the Co solution. The solution was allowed to stir for 24 hours, followed by rotovapping to dryness. The solid residue was dissolved in 30 ml of 10:1 toluene-(2,2-dimethyoxypropane) or pure toluene, filtered and rotovapped to dryness. The residue was dissolved in 30 ml of toluene, filtered and upon slow evaporation produced a deep black crystalline solid. A yield of 60 percent for the above catalyst was determined. The formula weight for this catalyst was determined to be 896.06 g/mole.

EXAMPLE V

Co$_2$(BNL)(OEt).(HOAc)

510 mg of Co(acetate)$_2$.4H$_2$O (2.05 mmoles) and 583 mg of H$_3$(BNL) were dissolved in 20 ml of degassed ethanol in the inert atmosphere box. After stirring for one hour the solution became a clear red, and the stirring was continued for two days. The ethanol was then removed by evaporation under vacuum, the residue dissolved in toluene, filtered and the toluene removed by evaporation under vacuum, producing a dark red crystalline solid. This method produced a 75 percent yield of the above catalyst, which was determined to have a formula weight of 802.92 g/mole.

EXAMPLE VI

Co$_2$(BNL)(OMe)(OAc)

372 mg of anhydrous Co(acetate)$_2$ (2.1 mmoles) and 583 mg of H$_3$(BNL) (1.0 mmoles) were placed in 25 ml of absolute methanol and 1 ml of 2,2-dimethoxypropane. The system was stirred for two days. The precipitate was filtered and washed with methanol. The product did have some solubility in the methanol, resulting in a low product yield. This method produces a 40 percent yield of this catalyst which was determined to have a formula weight of 787.88 g/mole.

EXAMPLE VII

Mo(HBNL)

To 40 ml of EtOH were added 471 mg (1.1 mmoles) of Mo$_2$ (acetate)$_4$ and 583 mg (1.0 mmoles) of H$_3$(BNL). The system was stirred under an atmosphere of ultra-pure (greater than 99.9 percent) Ar and the solution was heated to approximately 50° C. The reaction was continued for 5 days, periodically adding ethanol to keep the volume close to 40 ml (solvent evaporation occurred due to the continuous Ar flushing of the system). The solution was a dark brown and was evaporated to dryness via rotoevaporation with mild heating. The residue was extracted with toluene, with only a small fraction of the total solids being dissolved. The toluene was filtered and rotoevaporated to yield a glossy black solid (310 mg) which was dried in an abdehalden piston under vacuum at 80° C. for 18 hours. The formula weight for this catalyst was found to be 676.91 g/mole.

EXAMPLE VIII

Cr$_2$(BNL)(OEt)(OAc)$_2$

To a flask containing 583 mg of H$_3$(BNL) and 425 mg of chromium acetate hydrate (Aldrich), 35 ml of deoxygenated ethanol was added and the mixture stirred for nine days at ambient temperature inside of an inert atmosphere.

The flask was removed from the inert atmosphere box and the orange-red solution was then rotoevaporated to dryness. The solid residue was then extracted with toluene, filtered and the toluene solution rotoevaporated to a dark red crystalline solid. This material was found to have a formula weight of 847.05 g/mole.

EXAMPLE IX

Catalyst Use and Comparison

The Catalysts

Vanadyl, cobalt and molybdenum complexes of 4-tert-butyl-bis[2,6-N-(S-heptyldithiocarbamate)-formimidoyl]phenol were prepared as described above. These complexes will hereinafter be referred to as (VO)$_2$(BNL)(OEt), Co$_2$(BNL)(OEt), Co$_2$(BNL)(OEt)-

(OAc).toluene and Mo(HBNL), respectively. Ethylaluminum dichloride (EADC) and diethylaluminum chloride (DEAC) were used in conjunction with the above catalysts. These co-catalysts are commercially available.

acted BD remaining was then vented. The polymers were precipitated from solution in a large volume of methanol containing a small amount of an anti-oxidant. The products were dried under reduced pressure at 50° C. for 24 hours. The polymer yields obtained with the different polymerization systems are shown in Table I.

TABLE I

| Experiment No. | Catalyst | Cocatalyst | Grams of 1,3-Butadiene | Solvent | Time (hours) | Yield (grams) | Percent Conversion |
|---|---|---|---|---|---|---|---|
| 1 | $Co_2$(BNL)(OEt)(OAc).toluene (0.02 grams) | EADC/DEAC (0.5 ml/0.5 ml) | 10.77 | Toluene (50 ml) | 3 | 10.00 | 92.9 |
| 2 | $Co_2$(BNL)(OEt)(OAc).toluene (0.021 grams) | EADC (0.5 ml) | 12.96 | Toluene (50 ml) | 3 | 1.12 | 8.6 |
| 3 | $Co_2$(BNL)(OEt)(OAc).toluene (0.02 grams) | EADC (0.5 ml) | 12.80 | n—Heptane (50 ml) | 3 | 12.90 | 100.00 |
| 4 | $(VO)_2$(BNL)(OEt) (0.018 grams) | EADC (0.5 ml) | 10.95 | Toluene (50 ml) | 63.5 | 10.00 | 91.3 |
| 5 | $(VO)_2$(BNL)(OEt) (0.019 grams) | EADC/DEAC (0.5 ml/0.5 ml) | 11.30 | Toluene (50 ml) | 63.5 | 8.55 | 75.7 |
| 6 | $(VO)_2$(BNL)(OEt) (0.020 grams) | EADC (0.5 ml) | 11.34 | N—Heptane (50 ml) | 66 | 9.76 | 85.8 |
| 7 | Mo(HBNL) (0.020 grams) | EADC/DEAC (0.5 ml/0.5 ml) | 12.99 | Toluene (50 ml) | 63.5 | 6.25 | 48.1 |

Process Steps, Conditions and Apparatus

Polymerization was conducted in a clean, dry 7-oz. crown cap bottle. The cap was perforated and sealed with a rubber liner to permit the injection of the reaction components via a hypodermic syringe.

The charging procedure varied somewhat, depending upon the solvent employed. The catalyst complexes are soluble in aromatic solvents, but not in aliphatic hydrocarbons.

Polymer Structure comparison

The structures of the polybutadienes produced by the catalysts of the present invention, as determined by proton nuclear magnetic resonance spectroscopy, are shown in Table II. The data show that the production of cis-1,4-polybutadiene with these catalysts is favored by the use of aromatic solvents and the mixed EADC-/DEAC co-catalyst.

TABLE II

Structure of the Polymers Produced by the Bi-Nuclear Catalysts

| Catalyst | Cocatalyst | Solvent | % 1,4-Cis | % 1,4-Trans | % 1,2-Vinyl | % Olefin |
|---|---|---|---|---|---|---|
| $Co_2$(BNL)(OEt)(OAc).toluene | EADC/DEAC | Toluene | 100 | — | — | — |
| $(VO)_2$(BNL)(OEt) | EADC/DEAC | Toluene | 75.9 | 20.8 | 3.0 | 5.0 |
| (Mo)(HBNL) | EADC/DEAC | Toluene | | | | |
| Soluble Fraction | | | 68.7 | 22.3 | 8.9 | 5.0 |
| Insoluble Fraction | | | 65.5 | 30.8 | 3.6 | 4.0 |
| $(VO)_2$(BNL)(OEt) | EADC | n—Heptane | Mixed Structure | | | |
| $(VO)_2$(BNL)(OEt) | EADC | Toluene | 41.7 | 48.8 | 10.3 | 3.0 |
| $CO_2$(BNL)(OEt)(OAc).toluene | EADC | n—Heptane | 28.4 | 66.7 | 4.8 | 2.0 |
| $CO_2$(BNL)(OEt)(OAc).toluene | EADC | Toluene | 59.6 | 22.6 | 16.4 | 3.0 |

Thus, when toluene was used as the solvent, 0.01–0.02 g of the selected catalyst complex was charged to the crown cap reaction bottle, followed by 50 ml of toluene (MC and B Omni-Solv ® grade, dried over 4A molecular sieves). When n-heptane was used as the solvent, the 75 ml of n-heptane (MC and B Omni-Solv ® grade, dried over 4A molecular sieves) was charged to the reaction bottle first; the catalyst complexes were then dissolved in the minimum amount of toluene (3–5 ml) and the solution added to the n-heptane.

The reaction bottles were then capped and purged with argon for 15–20 minutes via hypodermic needles inserted through the cap.

An excess of 1,3-butadiene (BD) was then injected into the reaction bottle. The bottle was then vented to the desired mass.

The catalysts were then activated by injection of the co-catalyst(s) into the bottle. The co-catalysts consisted of 0.5 ml of EADC (25 wt. percent in n-heptane) or 0.5 ml of EADC and 0.5 ml of DEAC (25 wt. percent in n-heptane).

The bottles were agitated in a constant temperature waterbath at 70° C. for the specified time. Any unre-

The invention claimed is:

1. A process for the polymerization of conjugated dienes comprising contacting the dienes at a temperature and pressure sufficient to cause polymerization with a catalyst system comprising
   (a) at least one transition metal complex of at least one binucleating ligand, which attaches to at least one nucleus containing at least one transition metal element of Groups IB through VIIB and Group VIII of the Periodic Table of Elements, and
   (b) an organometallic compound containing at least one element of Group IA, Group IIA or Group IIIA of the Periodic Table of Elements.

2. The process of claim 1 where the transition metal complex of (a) comprises at least one binucleating ligand which is attached to one or two nuclei and each nucleus independently contains at least one element of Groups IB through VIIB, Group VIII, Group IA, Group IIA and Group IIIA of the Periodic Table of Elements with the proviso that there is at least one nucleus containing at least one element of Groups IB through VIIB and Group VIII in the complex.

3. The process of claim 2 where the transition metal complex of (a) is at least one of

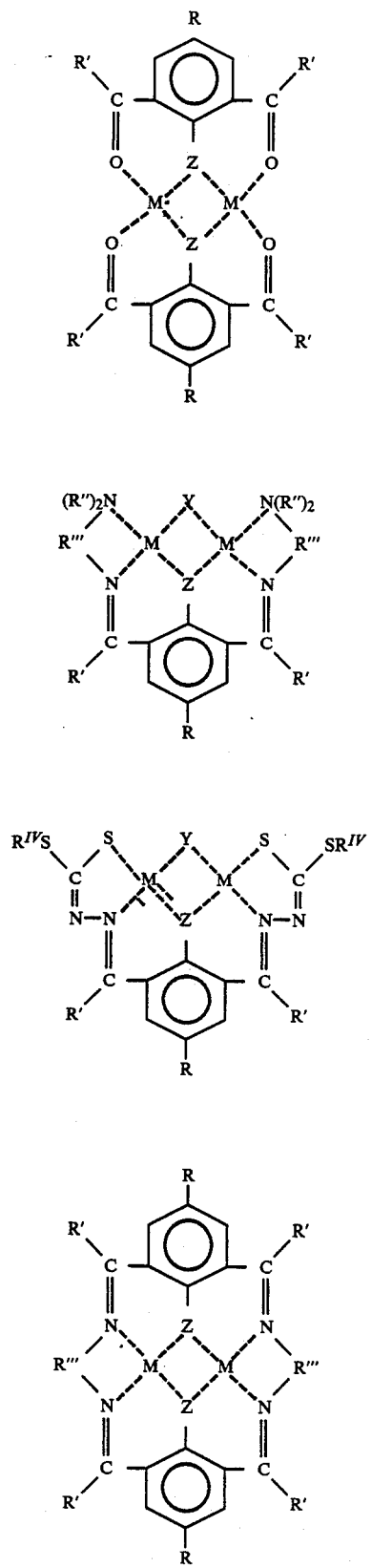

where
- each R and $R^{IV}$ are independently hydrogen, or an aliphatic, cycloaliphatic, or aromatic radical or an inertly substituted derivative of any one of these;
- each R' and R" are independently hydrogen or an aliphatic radical or an inertly substituted derivative thereof;
- each R''' is independently an aliphatic or aromatic radical or an inertly substituted derivative of any one of these;
- each M contains at least one element of Groups IB through VIIB and Group VIII, Group IA, Group IIA and Group IIIA of the Periodic Table of Elements with the proviso that at least one M contains at least one element of Groups IB through VIIB and Group VIII;
- Y is any coordinating anion; and
- Z is one of oxygen and sulfur.

4. The process of claim 3 where each R and $R^{IV}$ are independently one of a $C_1$ to $C_{20}$ aliphatic radical, a $C_5$ to $C_7$ cycloaliphatic radical, a phenyl radical and an inertly substituted derivative of any one of these.

5. The process of claim 4 where each R and $R^{IV}$ are independently an alkyl radical of 1 to 12 carbon atoms.

6. The process of claim 3 where each R' and R" are independently one of hydrogen, an aliphatic radical of 1 to 6 carbon atoms and an inertly substituted derivative thereof.

7. The process of claim 6 where each R' and R" are independently one of hydrogen, a $C_1$ to $C_6$ alkyl radical and an inertly substituted derivative thereof.

8. The process of claim 7 where each R' and R" are independently one of hydrogen and a methyl radical.

9. The process of claim 3 where each R''' is independently one of a $C_1$ to $C_8$ aliphatic radical, a $C_5$ to $C_7$ cycloaliphatic radical, a phenyl radical or an inertly substituted derivative of any one of these.

10. The process of claim 3 where each M, which contains an element of Groups IB through VIIB and Group VIII, is independently one of:
 (a) at least one transition metal element of Atomic Number 22 through 30 of the Periodic Table of Elements;
 (b) a coordination compound containing at least one transition metal element of Atomic Number 22 through 30 of the Periodic Table of Elements in its nucleus; and
 (c) at least one transition metal element of Atomic Number 22 through 30 of the Periodic Table of Elements combined with at least one of oxygen, sulfur and selenium.

11. The process of claim 10 where at least one M is independently cobalt, chromium and molybdenum.

12. The process of claim 10 where at least one M is independently at least one coordination compound comprised of at least one ligand of any alkoxide, azide, halide, sulfide, carboxylate, nitrate, sulfate, phosphate, amine, ether, thioether, phosphine, arsine, and oxime and containing at least one transition metal element of Atomic Number 22 through 30 of the Periodic Table of Elements.

13. The process of claim 12 where at least one M is independently one of acetato cobalt and acetato chromium.

14. The process of claim 10 where at least one M is independently at least one transition metal element of Groups IIIB through VIIB bonded to oxygen.

15. The process of claim 10 where at least one M is independently vanadium bonded to oxygen.

16. The process of claim 3 where one M contains at least one transition metal element of Groups IB through VIIB and Group VIII and the other M is at least one of hydrogen, beryllium, magnesium and calcium.

17. The process of claim 16 where one M contains at least one transition metal of Groups IB through VIIB and Group VIII and the other M is hydrogen.

18. The process of claim 17 where the one transition metal is molybdenum.

19. The process of claim 16 where one M contains at least one transition metal of Groups IB through VIIB and Group VIII and the other M is magnesium.

20. The process of claim 3 where Y is at least one of any alkoxide, halide, azide, hydrazide, hydroxide, cyanide, isocyanide, pyrozolate, amide and imidazolate.

21. The process of claim 20 where Y is one of ethoxy and chloride.

22. The process of claim 3, where the transition metal complex is of the following structure:

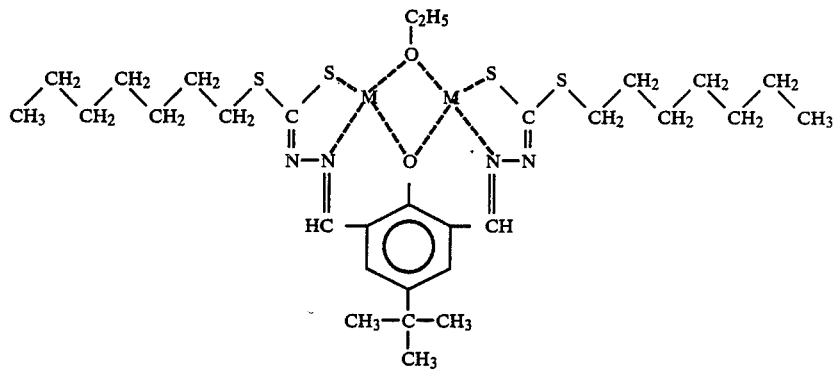

where each M is independently one of acetato chromium, acetato cobalt, cobalt or vanadyl.

23. The process of claim 22, where each M is acetato cobalt.

24. The process of claim 22, where one M is cobalt and the remaining M is acetato cobalt.

25. The process of claim 22, where each M is cobalt.

26. The process of claim 22, where each M is acetato chromium.

27. The process of claim 22, where each M is vanadyl.

28. The process of claim 3, where the transition metal complex is of the following structure:

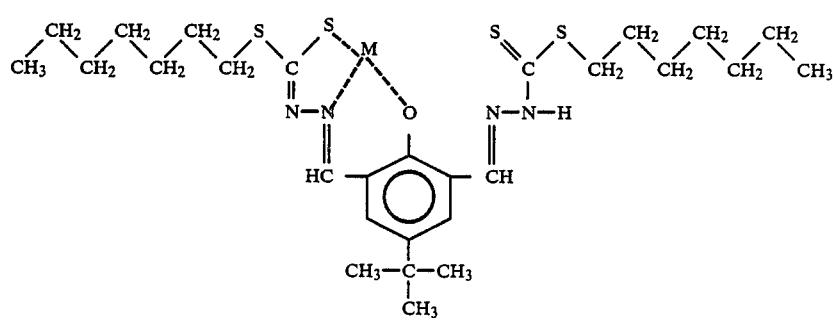

where M is one of molybdenum, cobalt, acetato cobalt, acetato chromium or vanadyl.

29. The process of claim 28, where M is molybdenum.
30. The process of claim 28, where M is cobalt.
31. The process of claim 28, where M is acetato cobalt.
32. The process of claim 28, where M is acetato chromium.
33. The process of claim 28, where M is vanadyl.
34. The process of claim 1 where the organometallic compound of (b) contains at least one of lithium, sodium, potassium, cesium, beryllium, magnesium, calcium, strontium, boron, aluminum, and gallium.
35. The process of claim 34 where the organometallic compound is at least one of:
   (a) di-sec-butylmagnesium;
   (b) n-butylmagnesium chloride;
   (c) aluminum triethyl and
   (d) compounds of the formula: $(R^V)_n AlX_{(3-n)}$
   where
      $R^V$ is at least one of an aliphatic, cycloaliphatic and aromatic radical of 1 to 8 carbon atoms,
      X is a halide and
      n is less than or equal to 3 but greater than 0.
36. The process of claim 34 where $R^V$, in the organometallic compound of the formula $(R^V)_n AlX_{(3-n)}$, is at least one of an alkyl, aryl, arylakyl, alkenyl and arylalkenyl radical.
37. The process of claim 35 where $R^V$ is at least one of an ethyl, isopropyl, sec-butyl, isobutyl, cyclohexyl, phenyl, benzyl, 1-octenyl and 1-phenyl-1-heptenyl radical.
38. The process of claim 34 where X, in the organometallic compound of the formula $(R^V)_n AlX_{(3-n)}$ is at least one of chlorine, bromine and iodine.
39. The process of claim 34 where X is chlorine.
40. The process of claim 34 where the organometallic compound of the formula $(R^V)_n AlX_{(3-n)}$ is at least one of ethylaluminum dichloride, ethylaluminum sesquichloride and diethylaluminum chloride.
41. The process of claim 34 where the organometallic compound is a combination of ethyl aluminum dichloride and diethylaluminum chloride.
42. The process of claim 1 where the mole ratio of the organometallic compound to the transition metal complex is between approximately 1:1 and 300:1.
43. The process of claim 42 where the ratio of the organometallic compound to the transition metal complex is between approximately 3:1 and 50:1.
44. The process of claim 1 where the conjugated diene is at least one of 1,3-butadiene, 1,3-pentadiene, 1,3-hexadiene, 2-methyl-1,3 butadiene, 2,3-dimethyl-1,3-butadiene and 2-chloro-1,3-butadiene.
45. The process of claim 1 where the conjugated diene is 1,3-butadiene.
46. The process of claim 1 where the temperature and pressure sufficient to cause polymerization are approximately 30° C. to approximately 200° C. and approximately 1 atmosphere to approximately 100 atmospheres, respectively.

* * * * *